Dec. 12, 1967     H. L. WITTEK     3,357,582
LOADING AND STACKING DEVICE
Filed Aug. 16, 1965     3 Sheets-Sheet 1
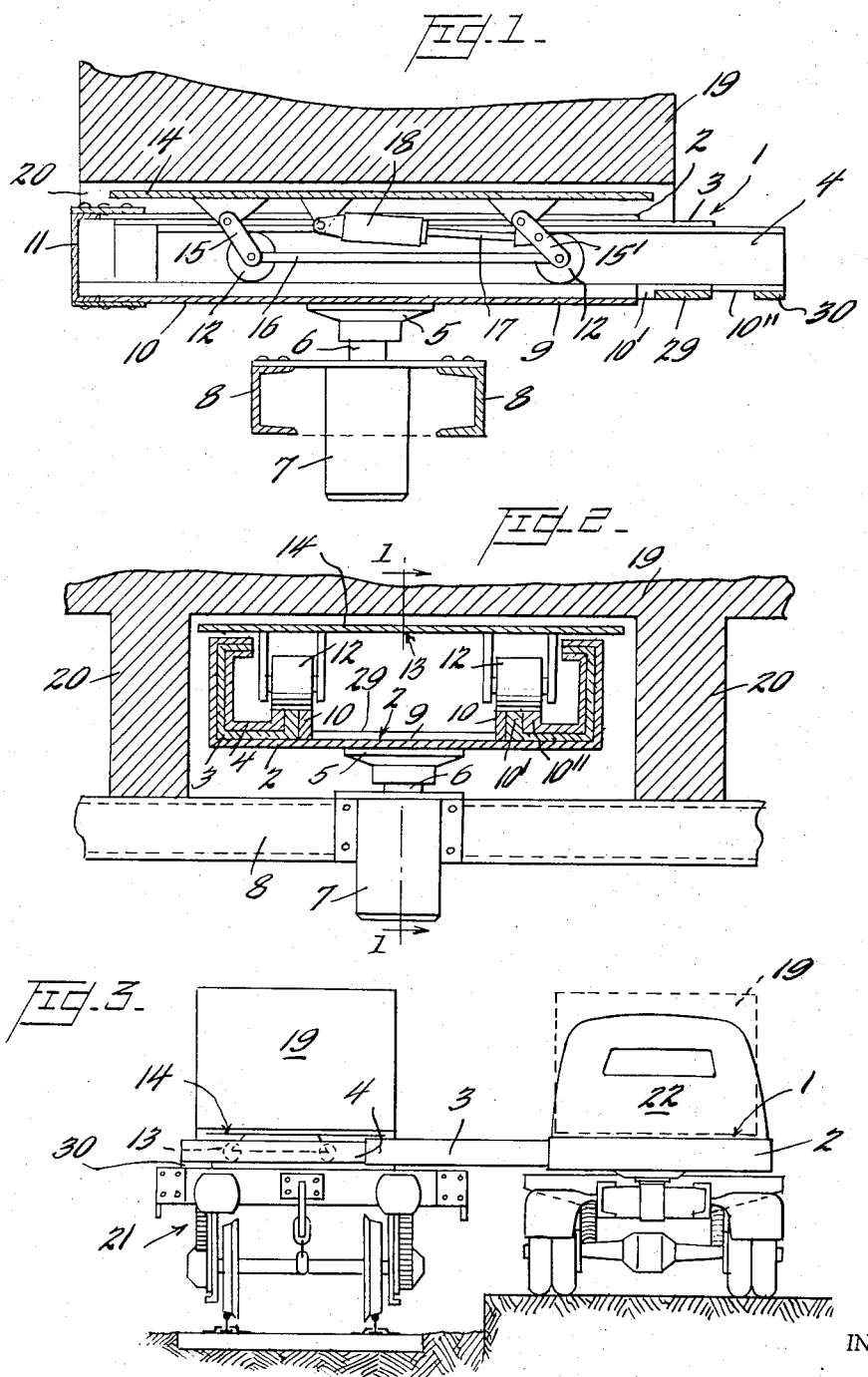
INVENTOR
*Hans L. Wittek,*
BY *Watson, Cole, Grindle & Watson*
ATTORNEYS Dec. 12, 1967        H. L. WITTEK        3,357,582
LOADING AND STACKING DEVICE
Filed Aug. 16, 1965        3 Sheets-Sheet 2
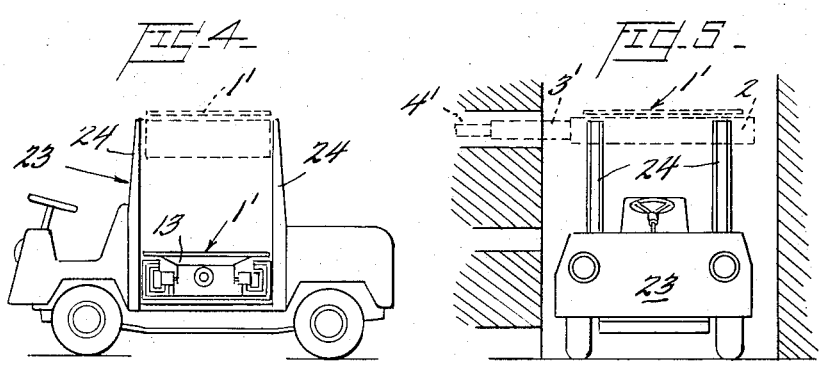
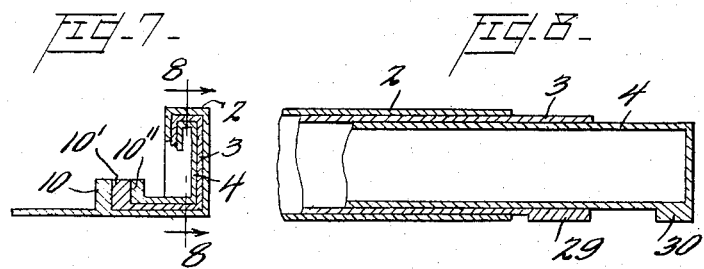
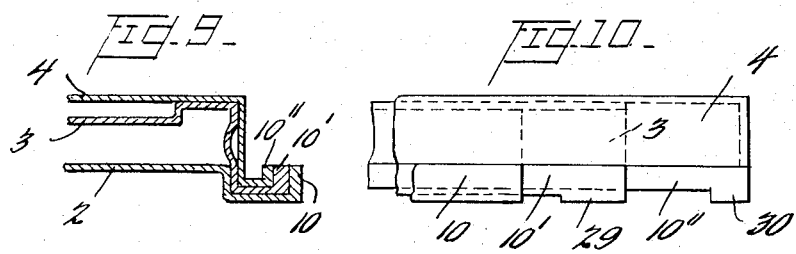
INVENTOR
Hans L. Wittek,
BY
Watson, Cole, Grindle & Watson
ATTORNEYS

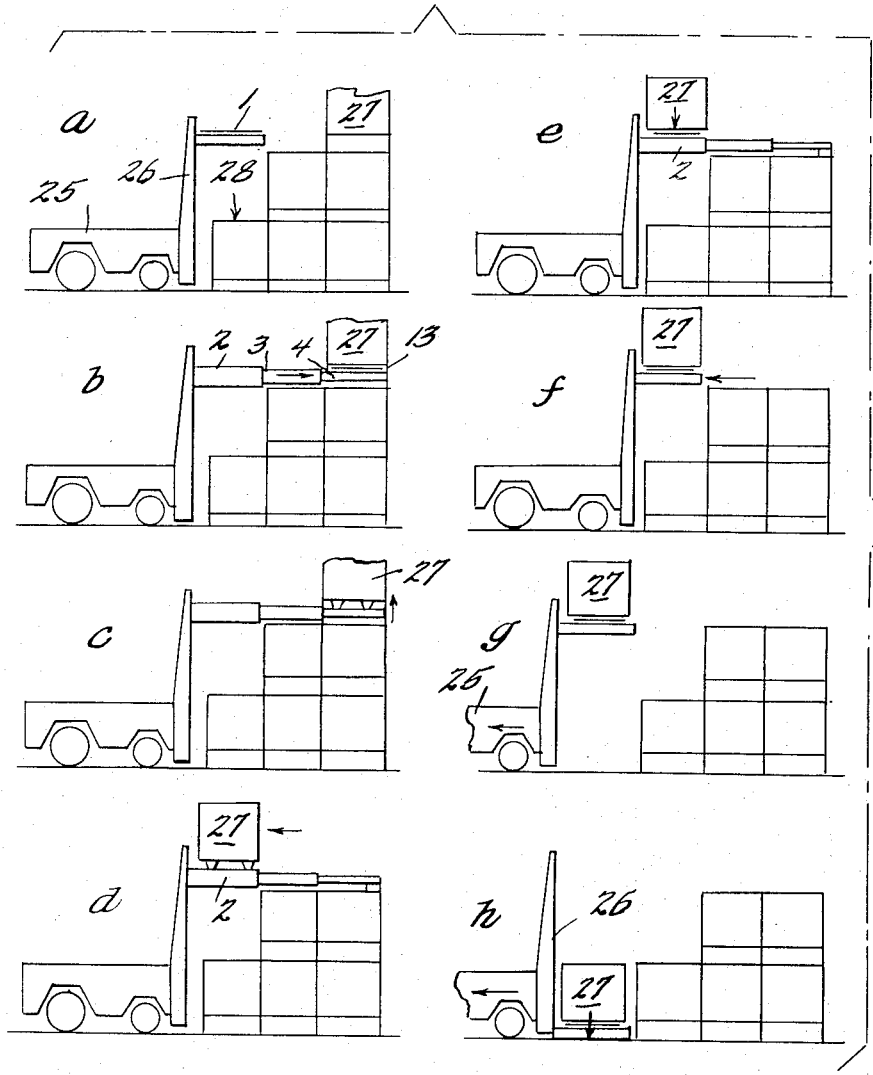

United States Patent Office 3,357,582
Patented Dec. 12, 1967

3,357,582
LOADING AND STACKING DEVICE
Hans Ludwig Wittek, Flossmoor, Ill.
(P.O. Box 93, Chicago Heights, Ill. 60411)
Filed Aug. 16, 1965, Ser. No. 480,083
5 Claims. (Cl. 214—512)

ABSTRACT OF THE DISCLOSURE

A material handling and transport truck for stackable and containerized goods having a frame with a bridge member composed of two telescoping sections, one fixed on the truck. A track is provided on the telescoping sections with a platform and means to vertically adjust the platform.

---

The invention relates to a loading and stacking device for materials and goods, particularly, containers for door to door and other transport. The handling and transporting of large pieces over considerable distances as well as their handling within a factory has always caused problems because of the difficulties connected with their transfer. Various auxiliary devices and expensive equipment are required to transfer the material from one location to another, particularly as these are usually at different elevations. This applies, for instance, when goods, boxes, crates, etc. have to be transferred from a freight car to a truck and also when material has to be handled between the point of its manufacture and the assigned storage space. The time and labor required for such transfer frequently causes substantial handling costs.

This transport is improved somewhat by the use of standard containers in door to door delivery and by the use of pallets for stackable materials, employing self-propelled equipment as, for instance, fork lift trucks and similar devices. Such devices have noticeably improved the handling of heavier goods with certain problems, related to their transport, have remained unsolved or the cost of suitable handling devices has remained a deciding obstacle. To simplify door to door transport, several solutions have not only been proposed but also have been introduced, and one of them is the so-called piggy-back system employing truck trailers, containing the shipment, which are carried on railroad flat cars. These trailers are hauled by trucks between the receiving point and the railroad and from there again to the point of delivery. This system has the disadvantage that the flat cars can only be loaded lengthwise so that the trailer has to be backed or pulled onto the flat car, occasionally having to pass over a number of other flat cars before it reaches the one to which it is assigned.

An additional object against prior systems concerns the fact that the weight of the truck trailer has to be transported also, and in addition, facilities for loading piggyback trailers are only available at large railroad yards.

Several side-loading systems are also in use for door to door transportation and several railroads use movable or fixed cranes or other lifting devices for the loading or unloading of containers. However, large investments are required for such arrangements which limits their use to important yards. Consequently, in most cases, the sideway loading of freight cars is still being performed by bringing a truck alongside and transferring the shipment from the one surface to the other by means of hydraulic or other equipment. During such transfer of the load there exists a danger that one of two vehicles may become unstable so that it has to be supported against the ground and, for this reason, this method also is rather complicated and time-consuming.

Transportation within manufacturing plants and warehouses face similar difficulties even when the transporting and stacking is performed by modern equipment as, for instance, fork lift trucks. Vehicles of this type require a relatively large amount of space to enable them to make the necessary turn for aligning themselves with the assigned storage space or shelf. When aisle space is limited, the lift truck cannot make a full 90° turn so that the material to be stacked cannot be placed at a right angle to the aisle, thus requiring additional floor space.

The capacity of all material handling vehicles, including fork lift trucks, is limited by their stability, a condition which is aggravated by the requirement that the length and width of such a vehicle must be made as small as possible. For this reason, the stacking depth which can be utilized by the customary fork lift truck is very small so that the ratio between the areas utilized for storage and that required for roadways is an uneconomical one.

It is an object of the present invention to provide a universally applicable load transfer machine which, while avoiding the disadvantages of the commonly used equipment, provides greater load carrying capacity and adaptability so as to permit bridging of larger distances between the vehicle and the storage area, particularly also at a right angle to the axis of the vehicle. The resulting saving in time and labor and a more economical material handling process is thus to be achieved.

Another object of the invention is to provide an extendable, height adjustable, preferably horizontal bridge, consisting of one fixed and at least one telescoping section, a track extending over the full length of the bridge on which the carriage operates. The latter carries a loading platform, adjustable in height, and the bridge, when extended, is supported by the surfaces on which the load rests. Due to this arrangement, the load transfer equipment requires very little space when the bridge is contracted. When extended the bridge forms a girder supported on both ends so that, assuming identical bridge sections, its load carrying capacity is about four times that of a cantilevered beam of the same length. Furthermore, both supports are subject only to vertical forces so that no tilting moment is produced, avoiding thereby the need for supporting either of the load carrying surfaces. Since the level of the bridge is vertically adjustable, it is unnecessary to have both surfaces, that from which the load is to be removed and the one where it is to be placed, at the same level. Thus, loading and unloading is simplified when storage area and the vehicle are not on the same level. By the same token, any change in level, during the load transfer process, as for instance, settling of the springs of a vehicle, can be equalized. At the same time, a bridge, according to the present invention, also permits a much greater distance between the two surfaces where the load is stored and to which it is to be transferred.

In the case of a transfer from a road vehicle to a railway car, it is, therefore, no longer necessary to place the two vehicles in close proximity to each other. When stacking goods in warehouses a much greater stacking depth can be achieved than heretofore. The vertically adjustable platform of the carriage is particularly advantageous when standardized containers are employed in door to door delivery or when palletized material is handled. Such containers or pallets, etc. are equipped with supports on which the actual load area rests. Consequently, there is sufficient room available between the underside of the container floor or the pallet and the floor on which they rest so that the bridge can be inserted. After the carriage has been placed between the bridge and the bottom of the container, the carriage platform is raised and the load lifted from its former contact with the floor. The load, thus, can be transferred to its new location and placed upon its support by lowering the movable carriage platform. Since the container or pallet must be raised and lowered over only a very short distance, a very small amount of energy or force is required. This fact, together with the reduced loading time, represents a substantial economic advantage.

In some cases, it will also be advantageous to permit the transfer bridge to swing around a vertical axis and this arrangement would solve the transfer problem which is created when the storage area and the loading area, due to limited available space, are not parallel to each other.

According to this invention, the loading bridge is mounted on a movable or self-propelled carriage as, for instance, a truck, or lift truck. This arrangement provides a remarkable simplification in material handling in all its various forms. Particularly in door to door service, new and varied design combinations can be created. In accordance with this invention, each extendable bridge section consists of a pair of symmetrically opposed girders of C cross section, the lower flanges having a rail shaped extension which forms a continuous track. The individual sections, forming the parts of the bridge, are reduced in profile so that each bridge section can be telescoped into the adjoining one. Thus, the bridge possesses a high load carrying capacity while at the same time the sections are guided accurately. Even a relatively small overlap between adjoining sections provides, in this fashion, sufficient rigidity when the bridge is fully extended. The rails form a continuous track for the carriage, without rail joints. In a preferred form of the invention, the carriage is equipped with cylindrical wheels, the rims of which are of sufficient width to cover the rails of all bridge sections. The carriage is guided with respect to the bridge by means of a suitable arrangement as, for instance, guiding rollers which prevent lateral misalignment. Thus, in spite of the sectioned design of the bridge, proper guiding of the carriage, over the full length of the fully extended bridge, is assured. When a carriage is employed which has a vertically adjustable platform extending over the car wheels in both directions, the platform can be brought to rest upon the longitudinal bridge members so that the wheels are lifted out of contact with the rails. In this manner, the load is secured in relation to the bridge, while the vehicle, equipped with this load transfer device is in motion.

In a further modification of the invention, the bridge can be mounted on a truck in such a way that, by means of an hydraulic or pneumatic lifting jack, the bridge is rotated in relation to the chassis of the vehicle.

A truck, thus equipped, does not have to be placed in the immediate proximity of the dock where the load rests since the extendable girder can bridge a substantial distance and since it can be leveled with the dock and extended very quickly and rapidly, being controlled from the driver's seat of the vehicle. Due to the simple operation of the load transfer arrangement, additional labor is not required. A further advantage consists in the possibility of mounting the equipment on an existing truck chassis without necessitating extensive modifications. It is also possible to lower the extendable bridge below the level of a truck body so that a vehicle, thus equipped, can also be used for normal trucking service. If the extendable bridge, according to the invention, is mounted on a mast of a lift truck, it can be arranged with its axis at a right angle to the longitudinal axis of the vehicle and can be made extendable to both sides. This arrangement will tremendously reduce the area required for aisle space in a warehouse since the lift truck will no longer have to be turned within the aisle so that the aisle width will be defined only by the width of the lift truck or that of the load. Since much greater stacking depth can be obtained, several rows of stacks can be placed behind each other, so that the distance between the successive aisles can be substantially increased. As noticeable lack of warehouse floor space extends throughout, the present invention permits much better utilization of existing warehouse floor space.

Further objects of the invention will be apparent from the following description when considered in connection with the accompanying drawings in which;

FIG. 1 is a longitudinal section of the loading device taken on line 1—1 of FIG. 2 in the direction of the arrows;

FIG. 2 is a transverse section of the loading device;

FIG. 3 is an end elevation showing the arrangement for loading freight cars by means of the device mounted on a road vehicle;

FIGS. 4 and 5 are side and front views, respectively, of a lift truck;

FIG. 6 is a diagrammatic view showing a schematic sequence, in eight phases, of the load transfer process applied to stackable goods by means of a conventional lift truck equipped with a device in accordance with this invention;

FIG. 7 is a partial section of a modified variation;

FIG. 8 is a longitudinal section taken along line 8—8 of FIG. 7 in the direction of the arrows;

FIG. 9 is a partial section of a detail; and

FIG. 10 is a side view of the detail of FIG. 9.

The transfer device, according to FIGS. 1 and 2, is an extendable bridge consisting of one fixed section 2 and two movable sections 3 and 4. The latter sections can be telescoped in relation to the fixed section 2 and this fixed section 2, by means of its fixed flange 5, is connected to the piston 6 of an hydraulic lifting cylinder 7. The whole assembly is mounted on the chassis of a truck, the frame of which is indicated by the symmetrical C or U profiles.

The fixed bridge, section 2, consists of a horizontal base plate 9, of which the longitudinal edges have been formed into vertical C profiles parallel with the movable sections. Base plate 9 on its upper side incorporates two rail-like extensions 10. The fixed bridge section 2, on one of its ends, is reinforced by a transverse member 11, forming a partial box section. The extendable bridge sections 3 and 4, each consist of a pair of symmetrically opposed longitudinal U-shaped girders of which the lower flanges, similar to the fixed section 2, carry rail-like protrusions or rims, 10, 10′, and 10″. The top surfaces of the rims are at the same elevation, forming an uninterrupted track for the wheels 12 of the carriage 13.

The width of wheels 12, FIG. 2, corresponds to the combined width of the rail heads or rims 10, 10′ and 10″ of all bridge sections so that carriage 13 always rests on at least one pair of rails while it travels the full length of the extended bridge 1. Carriage 13 is guided laterally by the upper flanges of the longitudinal profiles of the bridge sections 2, 3 and 4. The main components of carriage 13 are a flat platform 14 to the underside of which the wheels 12 are attached by means of rocker arms 15 and 15'. The rocker arms of each pair or of all wheels 12, are linked together by connecting rods 16, each rocker arm 15' being connected to a piston rod 17 of an hydraulic actuator or cylinder 18, of which the other end is attached to the bottom of platform 14. By activating the hydraulic cylinder 18, the platform 14 of carriage 13 can be raised and lowered with respect to wheels 12.

Longitudinal movement of the carriage 13 with respect to bridge 1 is achieved by conventional mechanical, electrical or hydraulic elements, not described in detail herein.

In FIGS. 1 and 2, the transfer bridge 1 is shown in its contracted condition. The container 19 has already been transferred to the vehicle equipped with the loading device and the container struts or legs 20 rests on the chassis frame rails 8 of the vehicle, the platform 14 of carriage 13 have been lowered.

FIG. 3 illustrates in detail the transfer of a container 19 from a flatcar 21 to a truck 22. The truck 22 is equipped with a horizontal transfer bridge 1 in accordance with the invention. In the position shown, container 19 still rests on flat car 21 and the bridge sections 3 and 4, having been brought to the proper level, are fully extended. Since, during the extension movement, the bridge is not loaded, supporting the truck frame with respect to the ground, is unnecessary. Carriage 13, with its platform 14 lowered, has already been placed under container 19. To transfer container 19 to truck 22, platform 14 is now raised with respect to carriage 13 until legs 20 of container 19 are clear of the top of the flatcar 21, the outer end 30 of extendable section 4 transmitting the weights of container 19 and the outer end of bridge 1, to the flat car 21. The loaded carriage is returned over bridge sections 4 and 3 to fixed section 2 so that the container 19 is placed in the position indicated by dotted lines directly over the truck 22.

Container 19 is now placed on the chassis or load surface of truck 22 by lowering platform 14 of carriage 13. After movable bridge sections 3 and 4 have been retracted, the transfer is completed and then truck 22 carries container 19 to its destination.

Transfer bridge 1, during the entire transfer method, represents a beam supported at both ends, so that, assuming similar sections and moments of resistance, its load carrying capacity is much greater than that of a cantilevered fork. If the transfer of load should alter the relative elevation of the two vehicles, it is easily compensated by the height adjusting device of transfer bridge 1.

Application of the invention to industrial material handling equipment is shown in FIGS. 4 and 5, in which a lift truck contrary to the usual arrangement, has its load lifting and transferring equipment installed transversely to the longitudinal axis of the vehicle instead of parallel thereto. It consists of a horizontal bridge 1' which, however, differing from the previously described construction, in addition to the fixed bridge section, is equipped with movable sections 3' and 4' which can be extended in both directions. The frame of the lift truck 23 is lowered between front and rear axles, FIG. 4, so that space is provided to receive the transfer bridge 1'. Lift truck 23 has a lifting device consisting of four vertical columns 24 which guide the bridge assembly vertically. Raising and lowering of the bridge 1 is performed by customary devices, not shown in the drawing.

FIG. 5 illustrates how extremely narrow aisles will accommodate a lift truck 23 in accordance with the invention since, due to the transverse placement of the transfer bridge 1', the vehicle no longer has to be turned within the aisle.

At the same time stacking depth can be increased without danger of the vehicle turning over since, in this case also, the outer end of the extended transfer bridge 1' serves as its second support. In addition, the transverse disposition of the transfer bridge permits storing the loads at right angles to the aisle, thus greatly increasing utilization of floor space.

When a transfer bridge, in accordance with the invention, is mounted on a usual fork lift truck, the transfer bridge is mounted on its mast 24 in place of and in the same manner as a fork. The schematic FIG. 6 shows the sequence of the transfer phases a to h when a box 27 is to be removed from the third stack. The lift truck 25, with its transfer bridge 1' raised to proper elevation, is driven up to the nearest stack 28 (phase a). Bridge sections 3 and 4 are extended and lowered until the outer end of section 4 rests on the box directly below box 27. Carriage 13 is now run out (phase b). The platform of carriage 13 is raised so that box 27 is lifted clear from its support (phase c). Carriage 13, with box 27 now resting on it, is now run back until it is above the fixed bridge section (phase d), carriage platform 14 is lowered so that box 27 rests on the fixed bridge section (phase e). The movable bridge sections are retracted (phase f) and the load is now handled like a common fork lift truck (phases g and h).

Under certain conditions a particularly rigid bridge design may be desired. This requirement can be met by the structure shown in FIGS. 7 and 8. Here, the rim edges of the top flanges of sections 2, 3 and 4 are bent downwards, resulting in greater bending stiffness and rigidity of bridge sections 2, 3 and 4 and in improved guiding of the telescoping sections. The outer end of the retractable section 4 can be completely closed, producing additional stiffness. The inner end of the fixed section 2 can be stiffened in a similar manner.

The variation in FIGS. 9 and 10 places the rails 10, 10' and 10" for the carriage 13 on the outsides of the bridge sections. In this case, the bridge sections 2, 3 and 4 of plates of which the outside edges have one downward and two upward bends, the last bend properly reinforced, forming the rails 10, 10' and 10". The center parts of each bridge section can be further strengthened by appropriate bends as shown for section 3. Using continuous plates for sections 2, 3 and 4, results in a bridge which is extremely rigid as to bending and torsion.

The design variations shown herein represent only a small portion of the combinations possible within the scope of the present invention. In particular, there exists no limitation as to the possible design variations applicable to details of the sections and shapes employed the arrangement of its connecting members and the configuration of the carriage.

I claim:

1. A material handling and transport truck for stackable and containerized goods, comprising a truck frame, a bridge member mounted on the truck and having at least two telescoping sections of which one is fixed on the truck and arranged in a substantially horizontal position, a track on the telescoping sections, a platform having means to roll on the track, means to vertically adjust the platform to raise the latter against the goods to transfer the latter from a stack for transport, the bridge member being composed of a fixed section and at least two shiftable sections, and each section being composed of a pair of symmetrical U-shaped profiles facing each other, and having lower flanges which carry track forming a continuous means, and the extendable sections being progressively reduced in overall dimensions to permit telescoping successive sections into each other.

2. A material handling and transport truck according to claim 1, in which the platform has cylindrical wheels of such width that they cover the total width of the rail of all bridge sections in their retracted condition.

3. A material handling and transport truck for stackable and containerized goods, comprising a truck, frame, a bridge member mounted on the truck and having at least two telescoping sections of which one is fixed on the truck and arranged in a substantially horizontal position, a track on the telescoping sections, a platform having means to roll on the track, means to vertically adjust the platform to raise the latter against the goods to transfer the latter from a stack for transport, each section of the bridge member consisting of a continuous plate, the outer edges of which have a downward bend followed by two upward bends and the outer edges of the last upward bend lying side by side forming at least a part of the rails for the truck.

4. A material handling and transport truck according to claim 3, in which the truck frame is provided with a plurality of vertical columns mounted thereon with the bridge member mounted between the columns to be extended laterally from the truck frame.

5. A material handling and transport truck according to claim 1, in which the telescoping sections have U-shaped portions which form the track.

References Cited

UNITED STATES PATENTS

| | | | |
|---|---|---|---|
| 1,830,740 | 11/1931 | Leech et al. | 214—38 |
| 2,004,095 | 6/1935 | Hankins et al. | 214—38 |
| 2,831,588 | 4/1958 | Seed | 214—38 |
| 3,233,768 | 2/1966 | Turturro et al. | 214—730 |
| 3,252,608 | 5/1966 | Proler | 214—516 |

FOREIGN PATENTS 1,006,794   4/1957   Germany.

GERALD M. FORLENZA, *Primary Examiner.*

ALBERT J. MAKAY, *Examiner.*